(12) United States Patent
Goodman et al.

(10) Patent No.: US 10,381,038 B2
(45) Date of Patent: Aug. 13, 2019

(54) AUTOMATED DATA STORAGE LIBRARY DRONE ACCESSOR

(71) Applicant: International Business Machines Corporation, Armonk, NY (US)

(72) Inventors: Brian G. Goodman, Tucson, AZ (US); Tom Haberman, Tucson, AZ (US); Michael P. McIntosh, Tucson, AZ (US); Shawn M. Nave, Tucson, AZ (US); Kenny Nian Gan Qiu, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,807

(22) Filed: Dec. 1, 2017

(65) Prior Publication Data
US 2019/0172488 A1    Jun. 6, 2019

(51) Int. Cl.
*G11B 15/68* (2006.01)
*B64C 39/02* (2006.01)
(Continued)

(52) U.S. Cl.
CPC .......... *G11B 15/689* (2013.01); *B25J 9/1664* (2013.01); *B64C 39/02* (2013.01); *B64C 39/024* (2013.01);
(Continued)

(58) Field of Classification Search
CPC .................. G11B 15/6895; G11B 15/689
See application file for complete search history.

(56) References Cited

U.S. PATENT DOCUMENTS 8,400,728 B2    3/2013  Thompson et al.
9,202,507 B1   12/2015  Krick et al.
(Continued)

FOREIGN PATENT DOCUMENTS

EP    2886493 B1    10/2016
FR    3007394 A1    12/2014

OTHER PUBLICATIONS

Goodman, Brian G. et al., "Drone Based Methods and Systems for Transfer of Data Storage Cartridges in an Automated Data Storage Library System", U.S. Appl. No. 15/828,788, filed Dec. 1, 2017, not yet published.

(Continued)

*Primary Examiner* — Thomas Randazzo
(74) *Attorney, Agent, or Firm* — Fox Rothschild LLP

(57) ABSTRACT

A data storage system that moves and transfers components utilizing drones is disclosed. The data storage system comprises a data storage library for reading and writing of data on a plurality of data storage cartridges, at least one drone vehicle, a processing device, and a non-transitory, computer-readable memory containing programming instructions. The programming instructions are configured to cause the processing device to: receive a request to transfer a data storage component to a destination location in the data storage library, in response to receiving the request, instruct a drone vehicle to perform at least part of the transfer of the data storage component to the destination location, and perform at least part of the transfer of the data storage component to the destination location by the drone vehicle.

19 Claims, 9 Drawing Sheets

(51) Int. Cl.
    *G05D 1/00*     (2006.01)
    *B25J 9/16*     (2006.01)

(52) U.S. Cl.
    CPC ........ *G05D 1/0011* (2013.01); *G11B 15/6895* (2013.01); *B64C 2201/128* (2013.01)

(56) References Cited

U.S. PATENT DOCUMENTS

| | | | |
|---|---|---|---|
| 2007/0211366 A1* | 9/2007 | Chamorro | G11B 15/682 360/69 |
| 2013/0259617 A1 | 10/2013 | Wang | |
| 2015/0050106 A1* | 2/2015 | Thompson | G11B 15/6835 414/273 |
| 2015/0231783 A1* | 8/2015 | Miller | B25J 9/1602 700/214 |
| 2016/0280460 A1* | 9/2016 | Porat | B65G 1/137 |
| 2017/0043953 A1* | 2/2017 | Battles | B65G 1/1373 |
| 2017/0190510 A1* | 7/2017 | Porat | B60L 58/12 |
| 2017/0293439 A1* | 10/2017 | Basham | G06F 7/36 |
| 2017/0320572 A1* | 11/2017 | High | B64C 39/024 |
| 2017/0323253 A1* | 11/2017 | Enssle | G06Q 10/087 |
| 2018/0075873 A1* | 3/2018 | Macias | G11B 15/6835 |
| 2018/0137456 A1* | 5/2018 | Fan | G06Q 10/087 |
| 2018/0196422 A1* | 7/2018 | Chow | G06Q 10/0834 |
| 2018/0284760 A1* | 10/2018 | Gupta | G05D 1/0016 |

OTHER PUBLICATIONS

Goodman, Brian G. et al., "Methods and Systems for Transfer of Data Storage Components in an Automated Data Storage System Using Drones", U.S. Appl. No. 15/828,815, filed Dec. 1, 2017, not yet published.

* cited by examiner

AUTOMATED DATA STORAGE LIBRARY DRONE ACCESSOR

BACKGROUND

The present invention relates to a data storage library for the storage and transfer of data, and more specifically, to a data storage library system that moves and transfers components (e.g., data storage cartridges and media) utilizing drone systems.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including, but not limited to, magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

Automated data storage libraries typically comprise data storage cartridge slots and cells to store and hold one or more data storage cartridges, and data storage drives that store data to, and/or retrieve data from, the data storage cartridge media. Data storage cartridge slots in a data storage library can be grouped into one or more frames and a library can include several frames each storing, for example, the same or different media types. Further, automated data storage libraries typically comprise import/export (I/O) stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

A robotic accessor in a data storage system typically traverses the array of data storage cartridge slots and cells using carousel structures, draw cable devices, and track/rail type systems. These systems may have a guide rail (or track) and a carriage (e.g., an accessor) that moves the storage media cartridges to and from the media drives. The guide rail forms a path for directing the carriage to any desired position, be it in a continuous loop of a carousel, a straight line, or other combinations of straight and curved sections.

Each data storage library typically has a finite capacity for tapes, so if the overall capacity requirements of a customer exceeds the finite capacity of the data storage library, addition of frames and/or a plurality of data storage libraries may have to be used and/or connected together in order to meet the capacity requirements of the customer. The throughput of data storage library systems is at least partly dependent on physical constraints relating to moving the robotic accessor, picking and placing cartridges, etc. For example, expanding the size of the library can effectively increase the distances traversed by the robot accessor when performing pick and place operations, and the like, which can thereby increase access times and reduce throughput. In addition, for the robotic accessors to move smoothly from one frame or library to the next, a precise and often complex system is needed to allow the tracks and rails from one frame or library to properly connect and align to the tracks and rails of an adjacent frame or library. This precision and complexity may result in added costs to each individual library in order to allow the robotic accessor to access the cartridges within each library.

SUMMARY

In an embodiment, a data storage system that moves and transfers components utilizing drones is disclosed. The data storage system comprises a data storage library for reading and writing of data on a plurality of data storage cartridges, at least one drone vehicle, a processing device, and a non-transitory, computer-readable memory containing programming instructions. The programming instructions may be configured to cause the processing device to: receive a request to transfer a data storage component to a destination location in the data storage library, in response to receiving the request, instruct a drone vehicle to perform at least part of the transfer of the data storage component to the destination location, and perform at least part of the transfer of the data storage component to the destination location by the drone vehicle.

In an embodiment, the data storage library may also include a plurality of data storage drives, a plurality of data storage slots, a library controller, and a docking station configured to associate with the at least one drone vehicle. In some embodiments, the docking station may comprise a docking structure, and a power source configured to supply power to the at least one drone vehicle. In at least one embodiment, the docking station may also include a coupling interface configured to operably couple the docking station to a frame of the data storage library. The docking structure may include one or more docking aids configured to engage one or more landing structures of the at least one drone vehicle and form a stable attachment. Examples of the docking aids may include, without limitation, slots, brackets, wedges, channels, grooves, recesses, latches, hooks, pins, tethers, magnetic docking aids configured to exert an electromagnetic field, and/or combinations thereof.

In an embodiment, the at least one drone vehicle may include a flight assembly, a frame, one or more landing structures, a power source, a package holding and securing assembly, and a control unit comprising a processing device and a memory. The package holding and securing assembly of the drone vehicle may include a gripper assembly configured to perform at one or more of: retrieving, releasing, and/or holding the data storage component. In some embodiments, the package holding and securing assembly may also include a holding structure for holding the data storage component during transfer. The at least one drone vehicle may also include a scanner module configured to read information from a data storage component.

In an embodiment, the docking station may be associated with at least one of the group consisting of at least one of the data storage slots, at least one magazine slot, at least one of the data storage drives, at least one robot accessor, and at least one I/O station of the data storage library.

In another embodiment of the disclosure, a drone vehicle configured for transferring components within a data storage library is disclosed. The drone vehicle may comprise a flight assembly, a frame, at least one landing structure, a package holding and securing assembly configured to hold and release the component, a power source, a processing device, and a non-transitory, computer-readable memory containing programming instructions. The programming instructions may be configured to cause the processing device to: receive a command for transferring the component to a destination location, cause the drone vehicle to retrieve the component from the current location by the package securing system, and cause the drone vehicle to move to the destination location by the flight assembly In an embodiment, the at least one landing structure may include at least one landing sensor such as, without limitation, an optical sensor, a radio sensor, a contact sensor, a pressure sensor, and/or combinations thereof.

In some embodiments, the package holding and securing assembly of the drone vehicle may include a gripper assembly configured to perform at one or more of: retrieving, releasing, and/or holding the data storage component. The package holding and securing assembly may also include a holding structure for holding the data storage component during transfer.

The at least one drone vehicle may also include a scanner module configured to read information from a data storage component. In an embodiment, the drone vehicle may, before retrieving the component from the current location, verify that the component stored in the current location is the requested component using the retrieved information.

In another embodiment of the disclosure, a method for transferring at least one component within a data storage library is disclosed. The method may include instructing a drone vehicle, by a processing device, to transfer the component to a destination location, and transferring the component to the destination location by the drone vehicle.

In some embodiments, the method may also include identifying a current location of the component in the data storage library, identifying a drone vehicle for transferring the component from the current location to the destination location within the data storage library, transmitting the current location of the component to the identified drone vehicle, and transmitting the instruction to transfer the component from the current location to the destination location to the identified drone vehicle. Identifying the current location of the component may include receiving the current location from a database.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
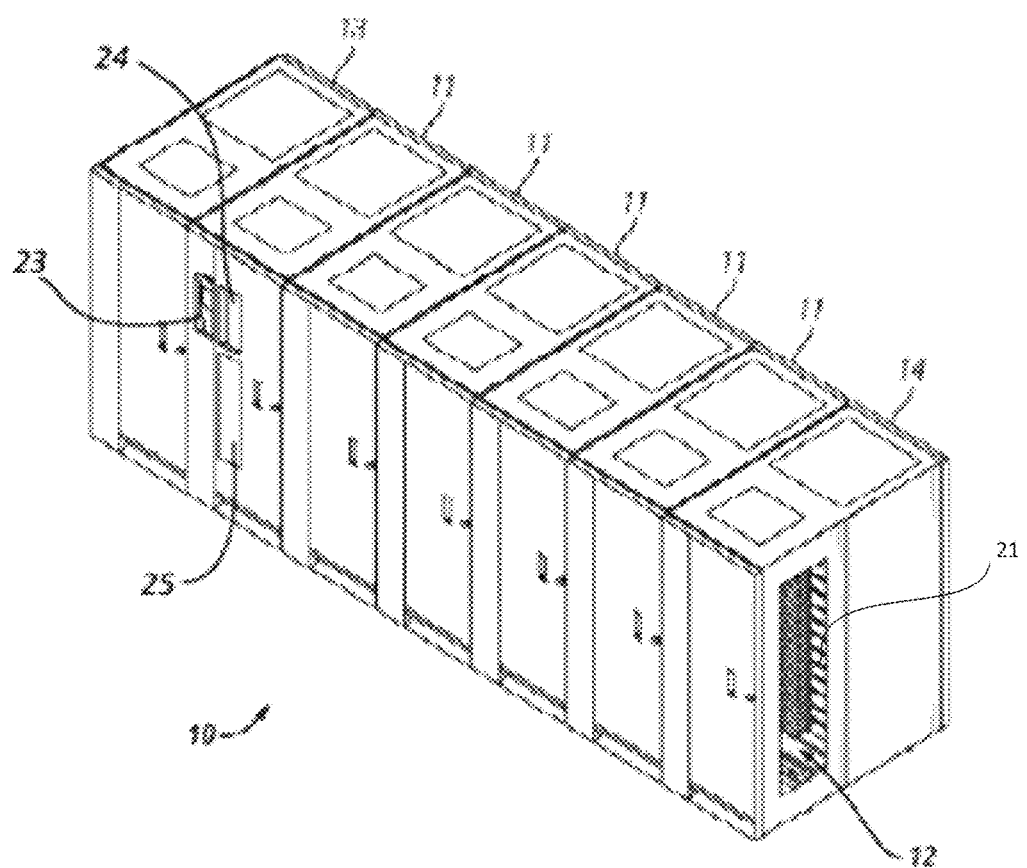
FIG. 1 is a perspective view of one embodiment of an automated data storage library.
Figure 2:
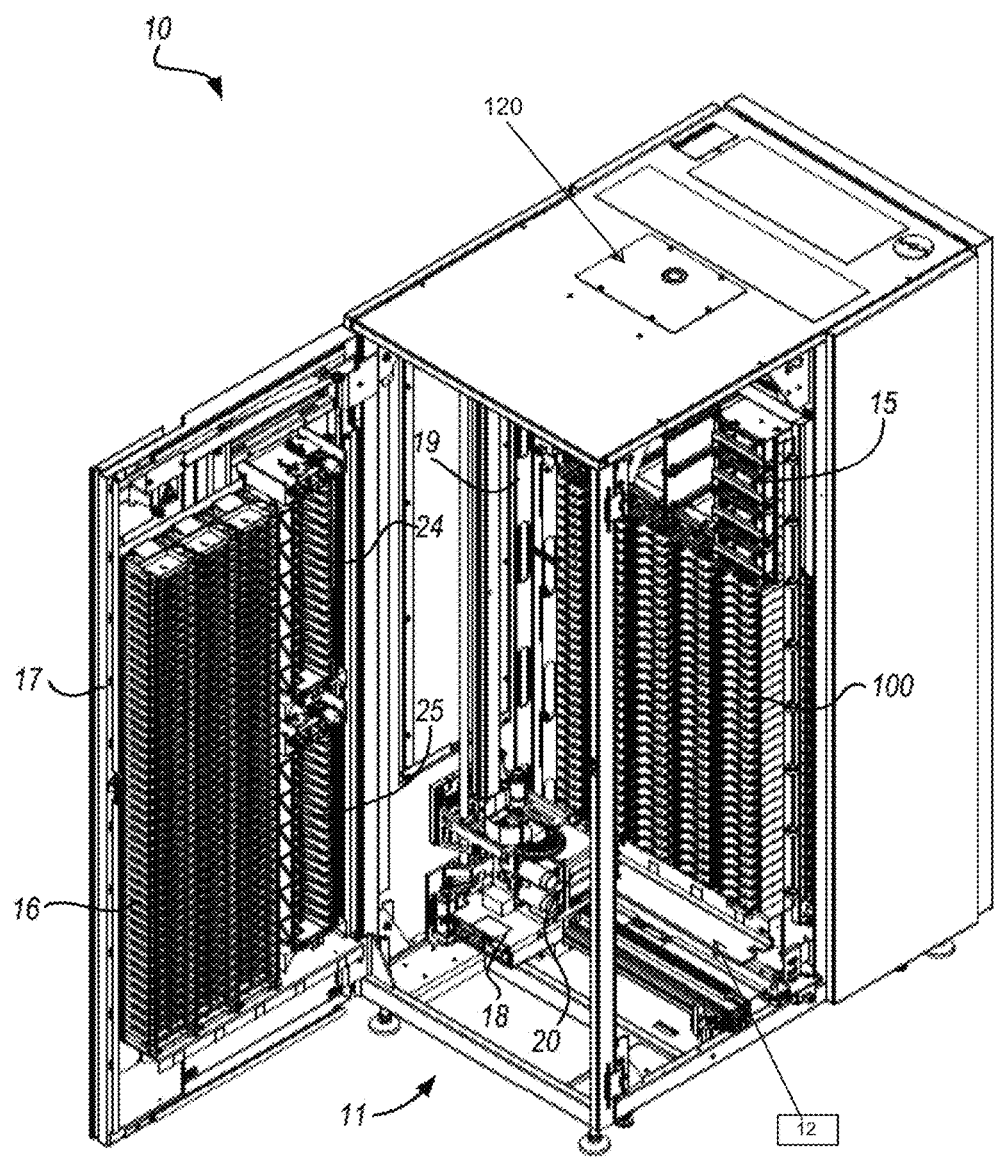
FIG. 2 is a perspective view of a storage frame from the data storage library of FIG. 1.

FIGS. 1 and 2 illustrate an example of a data storage system, e.g., an automated data storage library 10, which stores and retrieves data storage cartridges, containing data storage media (not shown), from multi-cartridge deep slot storage slots 100 and single cartridge storage slots 16. Herein, storage slot and storage cell refer to a location that may hold a data storage cartridge and the terms may be used interchangeably. Data storage library 10 also includes data storage drives 15 which read data from and/or write data to data storage cartridges. Examples of an automated data storage library which has a similar configuration as that depicted in FIGS. 1 and 2, and may be implemented with some of the various approaches herein may include IBM TS4500 Tape Library or the IBM TS3500 Tape Library. The library 10 may comprise a single frame 11 (as shown in FIG. 2) or multiple frames (as shown in FIG. 1).

The library 10 of FIG. 1 comprises a left hand service bay 13, one or more storage frames 11, and right hand service bay 14. A frame 11 may comprise an expansion component of a library. The storage frames may be added or removed to expand or reduce the size and/or functionality of the library.

FIG. 2 shows an exemplary embodiment of a storage frame 11, which may act as the base frame of the library 10. The storage frame 11 illustrated in FIG. 2 may have only a single robotic accessor 18 (i.e., there are no redundant accessors) to transport the data storage cartridges between the data storage slots, data storage drives, I/O stations, etc. The storage frame 11 in FIG. 2 has no service bays. In other embodiments, a storage frame may include multiple robotic accessors and the data storage library may have one or more service bays. The service bays 13, 14 act as a garage for holding the accessor away from the normal operating space during service or when the other accessor needs to gain access to data storage media or data storage drives that are close in proximity to the service bay.

Referring now to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than that illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first robotic accessor 18 may be used to transport data storage cartridges containing data storage media between the plurality of storage slots 16, the multi-cartridge deep slot cells 100, the data storage drive(s) 15, the I/O stations 24, 25, and/or pass-through mechanism portal 120 that may be associated with the library 10. The robotic accessor 18 moves within channel or aisle 12 formed in the data storage frame. According to various approaches, the data storage drives 15 may be optical tape or disk drives, magnetic tape or disk drives, electronic media drives, or other types of data storage drives that read and/or write data with respect to the data storage media. Storage frame 11 may also include an input or import station 24 and an output or export station 25 for transporting components such as data storage cartridges or data storage magazines in and out of the library 10. The accessor 18 may include a gripper 20 for retrieving, grabbing and/or releasing data storage cartridges, magazines or other components. Herein, references to data storage cartridges may also refer to data storage magazines, since a magazine may contain two or more cartridges. In other words, some libraries may include magazine slots, which hold two or more cartridges.

As illustrated in FIG. 1, the storage frame 11 may optionally include an operator panel 23 or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

As data storage needs grow, customers move to larger and larger libraries. Data storage libraries and frames typically have a maximum configuration before multiple libraries have to be connected together with pass-through-mechanisms for transporting data storage cartridges between the library frames. Many automated data storage libraries are expandable by adding storage modules/frames 11 that may also contain additional data storage slots and drives. As shown in FIG. 1, a frame 11 may comprise an expansion component of the library. Thus, storage frames 11 may be added or removed to expand or reduce the size and/or functionality of the library. According to different approaches, frames may include additional storage slots 16, deep storage slot cells 100, data storage drives 15, import/export (I/O) stations 24/25, accessors 18, operator panels, controller cards, communication cards, etc.

In addition, automated data storage libraries may support more than one accessor for improved performance and/or improved reliability. Two basic approaches to the use of multiple accessors in data storage libraries are commonly used. In one case, each module may contain a "pass through" port that allows a cartridge to be moved from one module (or frame) to another. In the second case, two or more accessors share the entire space of data storage library so that any accessor could access any data storage cartridge. For example, multiple libraries may be connected together with internal channels or pass-through mechanisms for transporting data storage cartridges between the multiple frames 11 and/or bays 13/14. For example, in one embodiment, an accessor aisle or channel 12 preferably extends between the storage frames 11 and bays 13, 14 of the embodiment in FIG. 1 thereby allowing a robotic accessor 18 to move between frames and/or bays to transport data storage cartridges. When multiple frames 11 are connected together, the track upon which the robotic accessor is riding on or attached to typically extends between the frames in the internal channel (or aisle) 12 so that the accessor can move between the library frames. A moveable and/or deployable panel 21 may be displaced to cover and/or block (as well uncover and/or unblock) aisle 12 from communicating with the exterior of the data storage library. Panel 21 may be moved and/or removed to permit access to the interior of the service bays 13, 14 and/or storage frames 11. Panel 21 may include a window to permit visibility into the library 10. It will be appreciated that one or more channels may be associated with the library.

Figure 3:
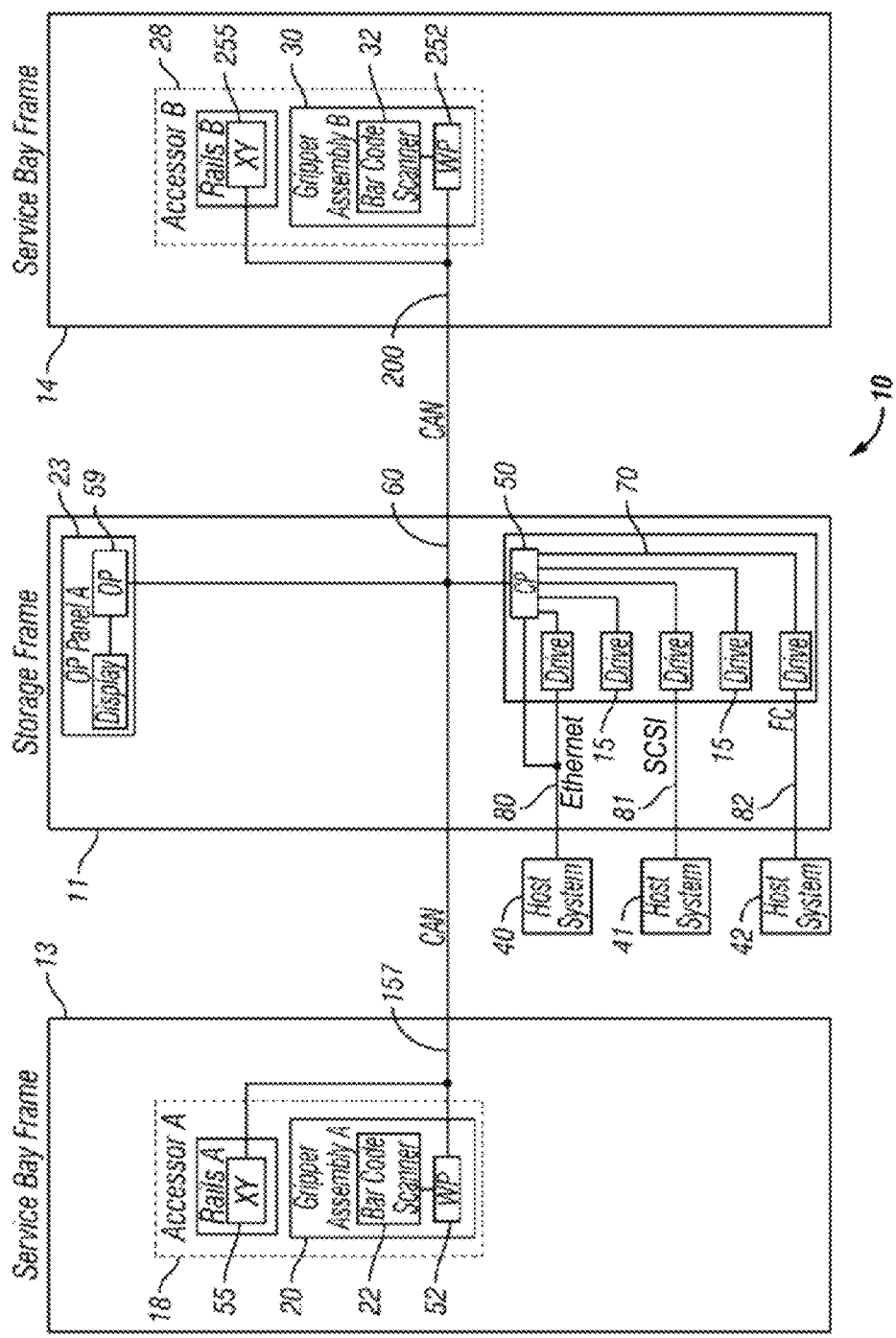
FIG. 3 is a schematic diagram of one embodiment of an automated data storage library.

Referring now to FIG. 3, the automated data storage library 10 as described in reference to FIG. 1 and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media. Also, an operator panel processor node 59 may be provided at the optional operator panel 23 for providing an interface for communicating between the operator panel and the communication processor node 50, the work processor nodes 52, 252, and the XY processor nodes 55, 255. Moreover, the illustrative control system may additionally include an extension network 200 that forms a network coupled to network 60 of the storage frame(s) 11 and to network 157 of left hand service bay 13 as illustrated in FIG. 3. However, as mentioned above, this is for illustrative purposes and in an alternate embodiment, network 157 may not be associated with the left hand service bay 13 and network 200 may not be associated with the right hand service bay 14. Moreover, depending on the design of the library, the data storage library may not include a left hand service bay 13 and/or a right hand service bay 14.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, the data storage drives 15 of library 10, and the I/O stations 24, 25. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the data storage drives 15, via at least one external interface, e.g., coupled to line 80.

As illustrated in FIG. 3, the communication processor node 50 is coupled to each of the data storage drives 15 of a storage frame 11, via lines 70, and may communicate with the data storage drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame, although additional storage frames may be possible in different library banks or storage. According to various approaches, any of the additional storage frames 11 may include communication processor nodes 50, storage slots 16, storage slots 100, data storage drives 15, networks 60, etc. Herein, frame may refer to an expansion component of a library, an expandable library and/or a non-expandable library.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry, memory, and/or logic, for controlling and/or providing at least some aspects of library operations.

Referring again to FIGS. 1-3, according to one embodiment, the controller of automated data storage library 10 may operate the accessor(s) 18, 28 to selectively extract, place and/or transport data storage cartridges with respect to the multi-cartridge deep slot storage slots 100, the storage slots 16, the data storage drive 15, and/or other elements, components and/or assemblies of the automated data storage library 10. For example, the controller may facilitate extracting a cartridge from a multi-cartridge deep slot cell 100 or the storage slots 16, transporting the cartridge to a data storage drive 15, and placing the cartridge in the data storage drive 15. The controller may then direct the accessor to extract the cartridge from the data storage drive 15 and to transport the cartridge to a specific multi-cartridge deep slot cell 100, and place the cartridge therein. Some libraries may transport magazines, which hold two or more cartridges, for part or all of a cartridge transport. For example, a magazine may contain a desired cartridge and the magazine may be transported in an effort to transport the desired cartridge. Herein, magazine refers to an assembly, structure or housing that can hold two or more data storage cartridges and can be removed or installed in one or more locations (i.e., a magazine slot) in a data storage library.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 4:
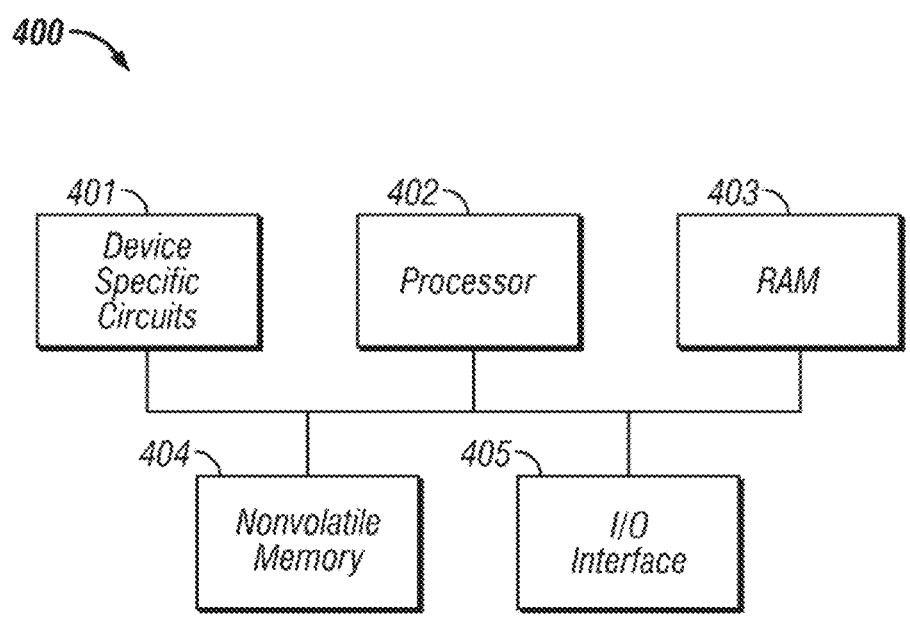
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and input/output (I/O) interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), Ethernet, RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper 20. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

Figure 5:
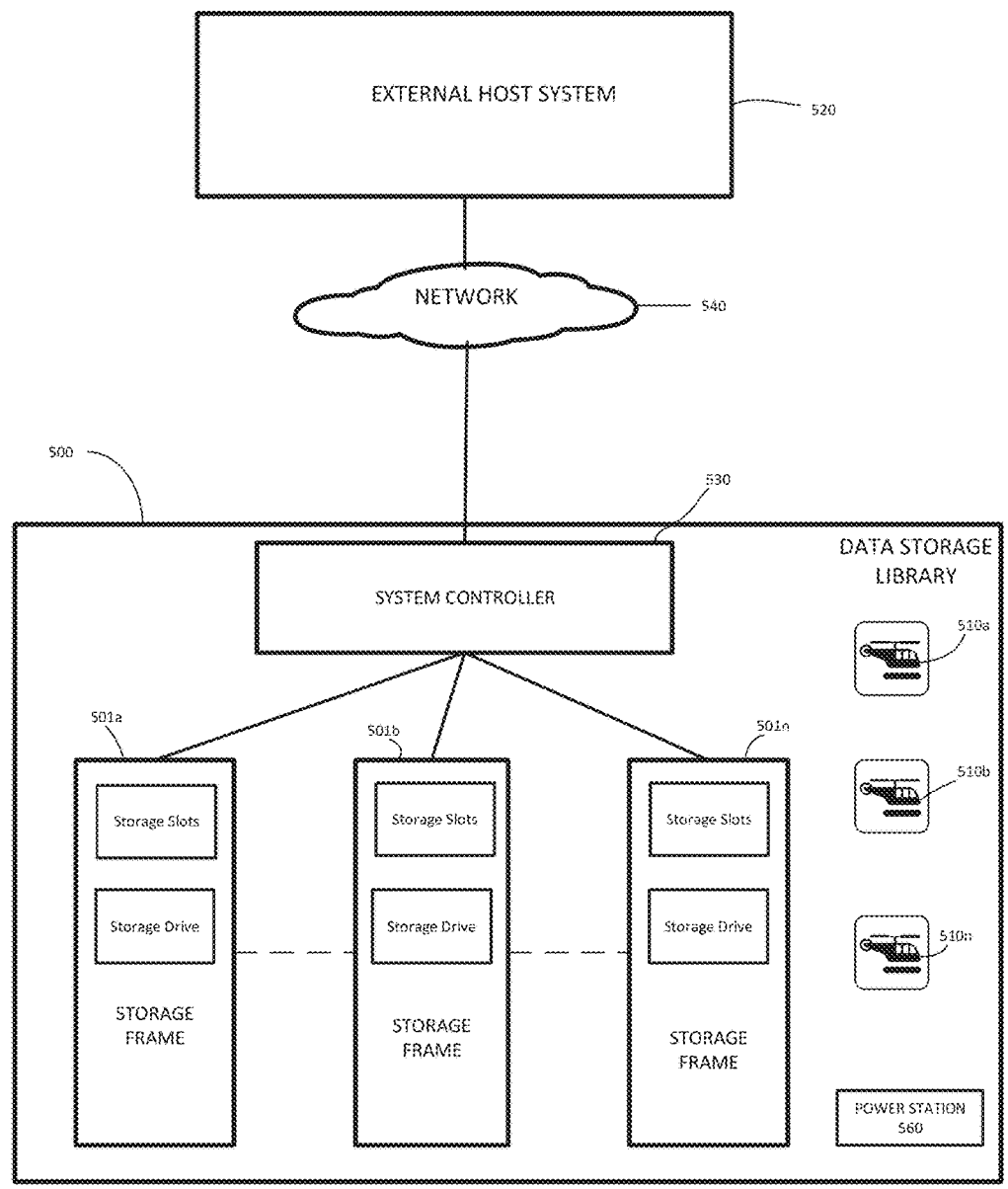
FIG. 5 is a functional block diagram illustrating a data storage library utilizing drones for transferring data storage cartridges and/or other components, according to an embodiment.

Referring now to FIG. 5, a functional block diagram illustrating a data storage library 500 that includes one or more storage frames 501a, 501b . . . 501n and that utilizes one or more unmanned aerial vehicles (hereinafter "drone", "unmanned aerial vehicle" or "UAV") 510a, 510b . . . 510n for transferring data storage cartridges (an/or other components) within the data storage library is shown. An unmanned aerial vehicle (UAV), commonly known as a drone, is an aircraft without a human pilot aboard. Flight of the UAV is controlled either autonomously by onboard computers or by a pilot using a remote control. The typical launch and recovery method of an unmanned aircraft is controlled by an automatic system or an external operator.

In an embodiment, the data storage library 500 may include a plurality of data storage frames 501a-n that are in communication with an external host system 520 over network 540, via a system controller 530. The data storage library 500 may also include a plurality of drones 510a-n configured to transfer components (e.g., data storage cartridges, data storage magazines, etc.) to and/or from the storage slots, magazine slots, data storage drives, and/or I/O stations within the data storage library 500. In an exemplary embodiment, the drones 510a-n are capable of movement in the x-, y-, and z-coordinate directions and capable of transporting components (e.g., data storage cartridges, data storage magazines, etc.) within the data storage library 500. In an embodiment, the drones 510a-n of the current system are configured to have a size and structure that enables them to handle and/or apply the forces required to retrieve, transfer, and/or place components (e.g., data storage cartridges, data storage magazines, etc.) to and/or from a storage slot, a magazine slot, a data storage drive, and/or an I/O station of a data storage library. Any number of drones 510a-n may be added to, or removed from, data storage library 500 as required to support the transfer of data storage components between the storage slots, magazine slots, storage cells, data storage drives, and/or I/O stations. In an embodiment, the system controller 530 is also in communication with the one or more drones 510a-n. While the drones are described and depicted as transferring data storage cartridges within the data storage library, it will be appreciated that the drones may be adapted and configured for transferring other components in addition to or as an alternative to data storage cartridges.

As discussed above with respect to FIG. 1, FIG. 2, and FIG. 3, a data storage library is typically used to store data storage cartridges in large arrays to store large amounts of data in one or more storage frames 501a-n. Thus, an interior of a storage frame 501a-n of a data storage library may include an area for storing data storage cartridges (e.g., multi-cartridge deep slot cells and single cartridge storage slots, collectively referred to as "storage slots" in the subsequent disclosure), one or more magazines that store two or more cartridges in removable housings, one or more data storage drives that store data to, and/or retrieve data from, data storage media, and I/O stations for transferring data storage cartridges to and from the data storage library 500, among other components which would be apparent to one skilled in the art upon reading the present description. Thus, looking to various embodiments presented herein, access to a storage slot, a magazine slot, a data storage drive, and/or an I/O station may include the ability to remove a cartridge from a storage slot, a magazine slot, a data storage drive, and/or an I/O station, the ability to place a cartridge into a storage slot, a magazine slot, a data storage drive, and/or an I/O station, the ability to remove a magazine from a magazine slot and/or an I/O station, the ability to place a magazine into a magazine slot, and/or an I/O station, or combinations thereof.

As discussed above, the data storage library 500 may include one or more drones 510a-n to transfer components, e.g., data storage cartridges, data storage magazines, etc., within the interior of the data storage library (e.g., within the storage frames 501a-n and/or service bays (not shown)), including to the I/O stations of the data storage library to transfer components into and out of the library system 500. The drones and associated docking stations and docking aids may be in addition to, in association with, as a redundant system to, as an alternate to, or a replacement of the robotic accessors described above. As discussed above, the drones 510*a-n* are capable of movement in the x-, y-, and z-coordinate directions. The drones 510*a-n*, as they are not attached to or riding on any track or mechanism, may move in any direction and/or by any route to transfer components (e.g., data storage cartridges, data storage magazines, etc.) within the library frames 501*a-n*. The drones 510*a-n* may share the entire space of data storage library so that a drone could access any data storage cartridge in the data storage library. Alternatively, and/or additionally, the drones may move within internal channels and/or pass-through ports that connect multiple frames together for transporting data storage cartridges between the multiple frames and/or bays of a data storage library.

In an embodiment, the data storage library 500 may also include at least one drone docking station to which a drone may selectively land or attach (dock) and take-off or detach (undock). The docking station may be integral with a library frame 501*a-n* or associated with a separate structure in the data storage library 500 (e.g., service bay frame). In an exemplary embodiment, the drone docking station may be relatively close to where a data storage component (e.g., data storage cartridge, data storage magazine, etc.) is to be retrieved or dropped off. For example, the drone docking station may be close to, adjacent to and/or associated with one or more data storage slots, magazine slots, I/O stations, and/or data storage drives in the data storage library 500. For example, each data storage drive in frames 501*a-n* may be associated with a docking station. Alternatively and/or additionally, each wall, floor and/or ceiling of the frames 501*a-n* may include at least one docking station. In yet another embodiment, the placement and layout of the docking stations in the data storage library 500 may be configured such that all the data storage slots and data storage drives in the data storage library 500 are accessible by a drone. In one embodiment, each data storage drive, data storage slot, and/or I/O station may have and/or be associated with a drone docking station.

Docking at a docking station at a source or a destination location allows the drone to rest from flight, thereby conserving energy while it performs data storage cartridge retrieval and placement operations. In addition, docking at a docking station allows the drone to have a stable and/or rigid base to facilitate the forces required to pick and/or place data storage cartridges as well as maintain relatively tight tolerances generally desirable during data storage cartridge retrieval and/or placement operations. Docking at a docking station may also allow the drone to connect to a power source where the drone may charge and/or utilize power directly from the library to pick and place data storage cartridges and/or recharge itself. For example, while at the docking station, the drone may connect to the library to supply power directly to a gripper mechanism to move, manipulate, and transfer the components (e.g., data storage cartridges, data storage magazines, etc.) to and/or from the drone. The power connection may also provide a communication link between the drone and one or more library controllers, by modulating, for example the power bus with a communication signal. Alternatively, and/or additionally, the drone may connect to a dedicated communication bus when it is docked at a docking station. Alternatively, and/or additionally, the drones may use wireless communication to communicate with the one or more library controllers, with other components of the data storage library such as the system controller, and/or with each other as discussed below in more detail.

In one embodiment, a docking station may be configured to, for example, stabilize the drone, enable a drone to recharge/refuel, provide an electrical coupling between the drone and the data storage library (e.g., to enable the drone to communicate with a library controller), reset navigation systems, await further instructions, or a combination thereof. One or more components (e.g., a gripper assembly) in the docking station may also be configured to drop off or pick up data storage cartridges, for example, from data storage slots and/or drones. In an embodiment, the drone may have a gripper assembly for retrieving or placing a data storage magazine and/or a cartridge from/to a location of the library. Alternatively, the drone may simply have a storage slot and/or a magazine slot for holding a data storage cartridge and/or magazine, and a gripper associated with the library may remove or place a data storage cartridge and/or magazine from/to the drone. This may be useful, for example, with a hybrid library system that has both robot accessors and drones for moving cartridges from one location to another.

Figure 6:
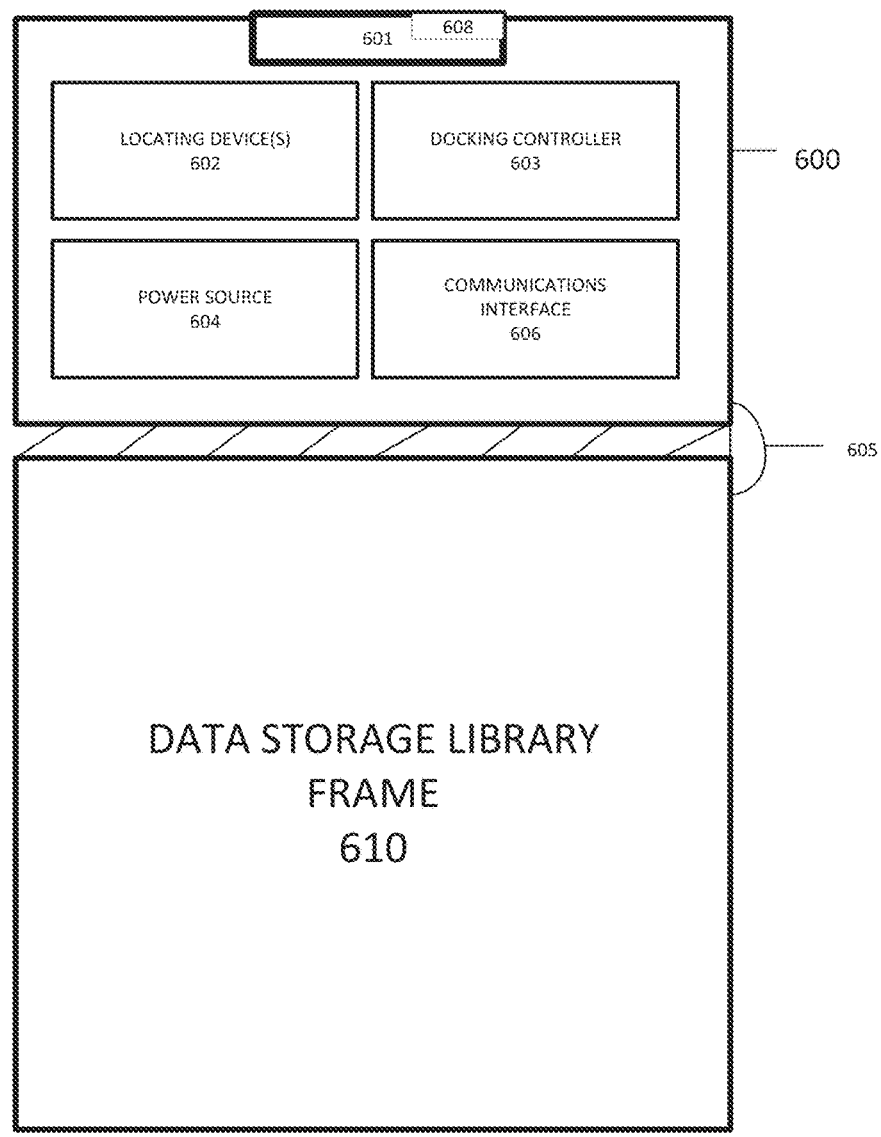
FIG. 6 depicts a block diagram of a docking station associated with a library frame, according to an embodiment.

FIG. 6 illustrates a schematic diagram of a drone docking station 600 associated with and/or attached to a library frame 610, according to one embodiment. As shown in FIG. 6, an exemplary drone docking station 600 may optionally include, without limitation, one or more docking structures 601, one or more locating devices 602, a docking controller 603, a power source 604 (e.g., recharge and/or refuel), a coupling interface 605, and a communications interface 606. Docking station 610 may include more and/or less components, and one or more of the identified components (e.g., docking structures 601, locating devices 602, docking controller 603, power source 604, coupling interface 605, and communications interface 606) may exist individually and/or be combined with and share parts, functionality, structure, and/or circuitry with other identified components.

In an embodiment, a docking structure 601 may include a platform, housing, or other similar structure for storing, docking, and/or launching drones. The docking structure 601 preferably stabilizes the drone, permits the drone to rest from flight, and/or provides a base to facilitate the forces required to transfer components (e.g., data storage cartridges, data storage magazines, etc.) to and/or from the drone. The docking structure also preferably maintains the tolerances desired when transferring components to and/or from the drone to other components (e.g., data storage slots, data storage drives, and/or I/O stations) of the data storage library. The docking structure 601 may also include one or more docking aids 608 configured to receive and/or engage one or more landing structures associated with a drone (discussed below) and may assist in securing the drone to the docking station 600 such that a stable connection or attachment can be made to the docking station. Examples of docking aids 608 may include, without limitation, slots, brackets, tethers, wedges, channels, grooves, recesses, latches, magnetic docking aids configured to exert an electromagnetic field, hooks, or the like, configured to stabilize the drone by engaging complementary landing structures of a drone. In an embodiment, one or more of the docking aids 608 may only be deployed when a drone is approaching and/or is attached to the docking station, and may be withdrawn in a receiving area of the docking structure 601 when the docking aid 608 is not deployed. Herein, landing structure and docking structure refer to structures, features, assemblies, etc. that allow a drone to come to rest for the purpose of charging, refueling, and/or transferring a component to/from the drone.

In an embodiment, a locating device 602 may assist and facilitate with accurately guiding and docking a drone to a docking station and/or docking structure (e.g., a docking aid). For example, the locating devices 602 may include an optical feature such as a visible landing target, sensors (e.g., pressure sensors), laser scanners, video cameras, or the like to guide the drone to a precise location during a landing or docking sequence, and a drone may use a complementary sensor and/or feature to more precisely guide the landing and/or positioning of the drone. The locating devices 602 may include optical locating devices, radio locating devices or a combination thereof. In some embodiments, the locating devices 602 may be emitters only, or may be a combination of shapes, emitters, receivers, transmitters, transceivers, and sensors. In some embodiments, each of the locating devices 602 may have an optical zone that emits an optical signal such as a directional or non-directional infrared beacon. Further, each of the locating devices 602 may have a radio signal, such as a directional or non-directional radio beacon or signal. The optical signal and the radio signal may be unidirectional or bi-directional. When the optical signals are bi-directional, the optical signal and the radio signal may function as sensing signals. Further, the optical signal and the radio signal may function as communication links. A drone 510 using the landing sensors (discussed below) may couple to the locating devices 602 such that a guided landing is facilitated. For example, the drone may obtain position and ranging information from the locating devices 602 which may inform the drone of its proximity with the docking station, a rate of descent, a relative position with respect to the docking station, or other information.

In an embodiment, docking station 600 may include a docking controller 603 to direct the operations of the docking station, the data storage library, and/or a drone attached to the docking station. The term "docking controller" as used herein is intended in its broadest sense as a device that includes at least one processor, and optionally further circuitry, memory, and/or logic, for controlling and/or providing at least some aspects of the docking station operations. Docking controller 603 may be in communication with a library controller, a system controller, and/or a drone control unit. For example, in an embodiment, a docking controller 603 may communicate with a drone to obtain information such as time of arrival, route information, power status, or the like, and control various operations of the docking station 600 based on the received information. Docking controller 603 may also provide guidance information to a drone 510, for example, through a GPS waypoint, with a known coordinate (e.g., latitude and/or longitude), or by operating one or more of the docking aids 608 and/or locating devices 602. In another example, a library controller and/or a system controller may communicate with the docking controller 603 to provide a request to transfer and/or move a component (e.g., a data storage cartridge, data storage magazine, etc.), and the docking controller 603 may determine the required actions (e.g., deployment of docking aids), and/or convert the actions to physical movements of various parts of the docking station 600. In another exemplary embodiment, a docking controller 603 may operate a power source 604 of the docking station to recharge and/or refuel a drone based on the battery status or fuel status of the drone 510. A docking controller 603 may include internal and external hardware components, as depicted and described in further detail with respect to FIG. 4. In an embodiment, a library controller may be and/or include a docking controller.

In an embodiment, docking station 600 may include a coupling interface 605 (e.g., for providing an electrical interface, a communications link, etc.) that interfaces with and/or physically connects with the data storage library frame 610 to operably couple the docking station 600 and the data storage library frame 610. For example, coupling interface 605 of docking station 600 may be a male receptacle connector, which mates with and receives a female pin connector of the library frame 610 or vice versa. In an alternate embodiment, the coupling interface 605 of the docking station 600 may be wirelessly coupled to the data storage library frame 610. In an embodiment, the coupling interface may be configured to provide an electrical interface between the docking station 600 and the library frame 610 such that the docking station 600 and the library frame 610 are directly electrically coupled and may provide a power link between the docking station and the data storage library. In an embodiment, the coupling interface 605 may be configured to permit communication (e.g. a communications link) between the docking station 600 and the data storage library e.g., a library controller.

In an embodiment, the docking station 600 may also include a communication interface 606 configured to permit communications between the docking station 600 and one or more components of the data storage library such as a library controller, a drone, and/or a system controller. The communications interface 606 may include a wired and/or a wireless communications link. In one embodiment, the drone has a communications connector that interfaces with and/or physically connects and makes contact with a communications connector on the docking station 600.

In an embodiment, the drone docking station 600 may also include a power source 604 to recharge, refuel and/or swap the energy storage and/or cell on the drone. The energy storage of the drone may be a battery, a super capacitor, lithium ion cell, fuel cell, or another power source. The energy storage may be recharged using direct or inductive charging from a power source 604 of a docking station. In an embodiment, the power source 604 of a drone docking station 600 may receive power from an associated frame and/or service bay of a data storage library. The power source may also power the docking controller 603, the locating devices 602, the coupling interface 605, the communications interface 606, and/or other components of the docking station 600. The power source 604 may also directly power the drone 510, its controllers, and/or mechanisms to move and manipulate components (e.g., data storage cartridges, data storage magazines, etc.). In an embodiment, the power source may be a light source and the drone may contain solar cells for converting the light to electricity.

It should be appreciated that one or more of the docking structures 601, docking aid 608, locating devices 602, docking controller 603, power source 604, and or communications interface may be omitted or combined. For example, docking aid 608, power source 604 and communications interface 606 may be combined as a connector that provides the functionality of the docking aid 608, the power source 604 and the communications interface 606.

Figure 7:
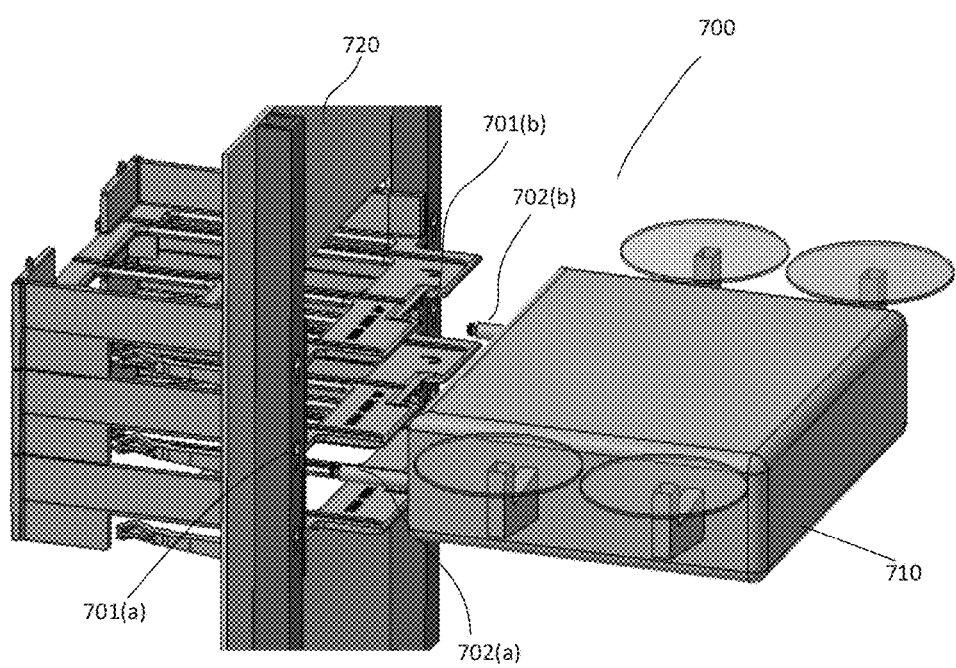
FIG. 7 illustrates a drone in the process of docking to a data storage library, according to an embodiment.

FIG. 7 shows an exemplary drone docking station 700 associated with a storage frame 720 according to an embodiment. The docking station 700 includes a docking structure 701 that has docking aids, e.g., slots 701(a) and 701(b) for engaging complementary docking pins 702(a) and 702(b) of a drone 710. The slots 701 and pins 702 engage each other in a manner that stabilizes the drone 710. The docking structure 701 in one embodiment may be sufficient to keep the drone stationary and/or permit the drone flight assembly to be powered down and rest from flight and/or be at a lower power level so as to conserve energy while it transfers components e.g., data storage cartridges, data storage magazines, etc. The docking structure 701 and complementary docking pins may also stabilize the drone 710 such that sufficient forces can be applied by the drone 710 to load and unload the components (e.g., data storage cartridges, data storage magazines, etc.) from the drones. The docking slots 701 and complementary pins 702 preferably sufficiently stabilize the drone to permit transfer of components between the drone and the data storage library while maintaining the required tolerances to the make the transfer. While the docking structure 701 of the docking station 700 in this embodiment is shown and described as slots 701 in the library frame that engage complementary pins 702 on the drone 710, it will be appreciated that the library frame may have pins, latches, and/or other structures while the drone may have complementary slots. Other structures and mechanisms are contemplated for docking structure 701 to assist, facilitate, attach and/or dock the drone 710 to the library frame 720.

The docking structure 701, and one or more of the slots 701(*a*) and 701(*b*) illustrated in FIG. 7, may optionally further be configured, arranged, and/or structured to include and/or be associated with one or more of power source 604, communications interface 606, and/or locating devices 602. For example, the slots and/or other docking structure 701 may make contact with one or more nodes that may provide power and/or communication links between the data storage library frame 720 and the drone 710. In addition, while drone docking station 700 is shown as being associated with a storage slot, it will be appreciated that the drone docking station 700 may be associated with and/or integrated with one or more data storage drives, one or more data storage magazine slots, one or more robot accessors, and/or one or more I/O stations.

In an embodiment, drones 510*a-n* may take on many different configurations and may include any type of transport configuration and/or arrangement configured to fly. In an exemplary embodiment, a drone may include a flight assembly which may include one or more or any combination of propellers, rotors, blades, etc. ("flight assembly") that generate a lifting force sufficient to lift the drone (including the drone structure, motors, electronics, and power source) and any loads (e.g., data storage cartridges, data storage magazines, etc.) that may be attached to the drone. The flight assembly may also provide a horizontal propulsion force so that the drone may move in any of the x-, y-, and z-coordinate directions and may move in any desired direction, and/or by any desired route. The flight assembly, including any motors, actuators, propellers, and/or propulsion assemblies, may be powered by a power source, such as an energy storage system like a battery, fuel cell, and/or a super capacitor. The flight assembly may be vertically and/or horizontally mounted depending on the flight mode of the drone.

One preferred flight assembly may include a plurality of electric motors powering a plurality of propellers or rotors. Each propeller may be associated with and/or connected to an electric motor. Several motors (e.g., servo motors) may act to move the motor/propeller assembly to provide the correct amount of angular rotation to provide desired vertical lift and horizontal propulsion. A common drone configuration suitable for use in the various embodiments is a "quad-copter" configuration. In an example of a quad copter configuration, typically four horizontally configured rotary lift propellers and motors are fixed to a frame. Drones configured with more or less propellers and/or motors are also contemplated. The frame may include structures that support the flight assembly, power source (e.g., battery), package securing mechanism, docking and landing structure (e.g., landing gear), and so on. The package securing and/or holding mechanism of a drone may include a gripper assembly for attaching to one or more components (e.g., data storage cartridges, data storage magazines, etc.). Additionally, and/or alternatively, an area enclosed by the frame and landing gear, and underneath the flight assemblies or propulsion units (e.g., a holding structure), may be provided to retain components such as a data storage cartridge. A quad-copter style horizontal rotary drone may fly in any unobstructed horizontal and vertical direction or may hover in one place. In the examples described herein, a quad-copter drone configuration is used for illustrative purposes, however, other drone designs are contemplated and may be used.

Figure 8:
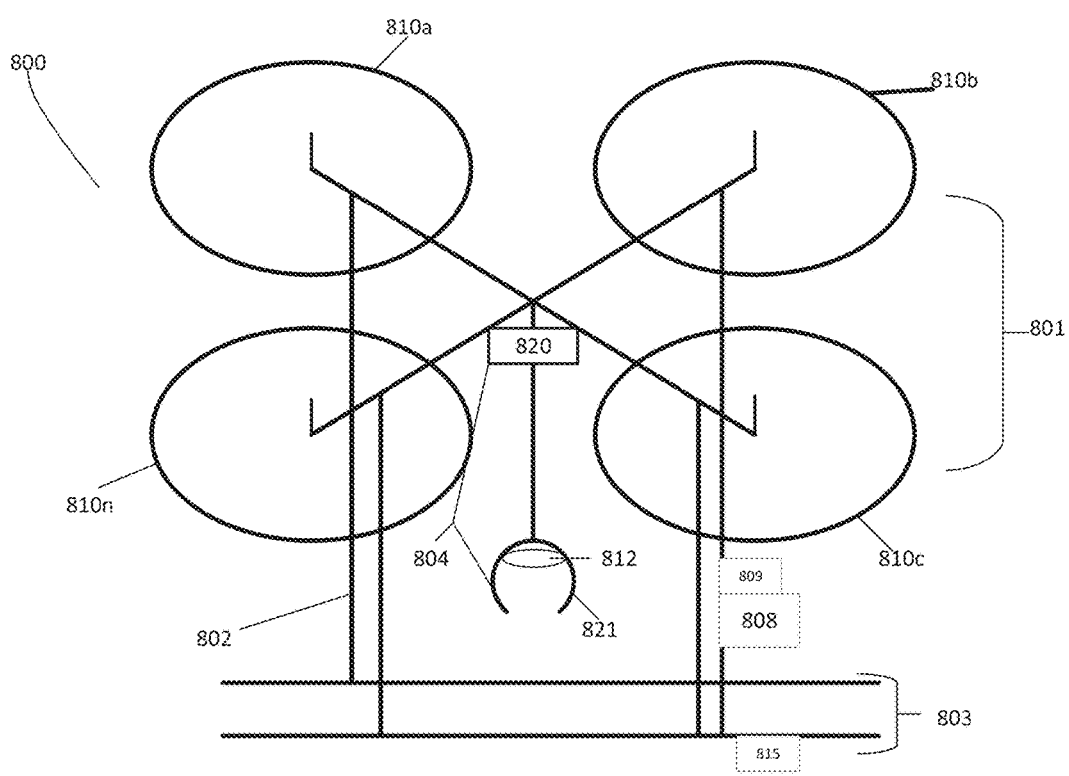
FIG. 8 depicts a schematic representation of various components of a drone, according to an embodiment.

An exemplary drone 800 configured to transport data storage cartridges (and/or other components) within the data storage library 500 according to various embodiments is schematically illustrated in FIG. 8. In an exemplary embodiment, the drone 800 may include a flight assembly 801, a frame 802, landing structures 803, a package securing and/or holding mechanism (e.g., gripper assembly or holding cell) 804, a power source (not shown here), and a control unit 808. The flight assembly 801 may include rotors 810*a*, 810*b*, 810*c* . . . 810*n*, and one or more associated motors (not shown here). For ease of description and illustration, some detailed aspects of the drone 800 are omitted such as wiring, skin or shell, frame structure interconnects or other features that would be known to one of skill in the art.

In an embodiment, the frame 802 may provide structural support for the flight assembly 801, the landing structures 803, and the package securing and/or holding assembly 804, and is configured to be sufficiently strong to support the maximum load weight for the combination of the components of the drone and the drone's expected load (e.g., a data storage cartridge or a data storage magazine).

In an embodiment, the package holding and/or securing assembly 804 may include one or more structure(s) configured to retrieve and/or place a component (e.g., a data storage cartridge, magazine, etc.) to and/or from storage slots, magazine slots, data storage drives, robot accessors, and/or I/O stations of a data storage library, and hold the data storage cartridge during transfer. In an exemplary embodiment, the package holding and/or securing assembly 804 may include, without limitation, a gripper assembly 821 and/or a holding structure 820. In some embodiments, the gripper assembly 821 may be configured to retrieve and/or place a component (e.g., a data storage cartridge or magazine) to and/or from storage slots, magazine slots, data storage drives, robot accessors, and/or I/O stations of a data storage library, and optionally may grip and/or hold the component during transfer. In an alternate embodiment, a drone may utilize the holding structure 820 for securely holding a component during transfer and the gripper assembly 821 may place and/or retrieve a component into and/or from the holding structure 820. In yet another embodiment, robotic accessor or another mechanism included in the library may place a component in the holding slot 820 of the drone 800 and there may not be a gripper assembly 821. In an embodiment, the size and configuration of the gripper assembly 821 may be extendible or adjustable in order to provide adequate access to storage slots, magazine lots, data storage drives, robot accessors and/or I/O stations from a docking station.

In an embodiment, a gripper assembly 821 of the package holding and/or securing assembly 804 may retrieve, grip and/or release components (e.g., data storage cartridges, data storage magazines, etc.) to and/or from storage slots, magazine slots, data storage drives, robot accessors, and/or I/O stations in the data storage library. A gripper assembly 821 may include an actuator, solenoid, and/or motor that drives a gripping and release mechanism to retrieve, grip and/or release a data storage cartridge or other components in response to commands from a control unit or in response to a docking operation, or the like. For example, the docking controller 603 and/or the control unit 808 of the drone may operate the actuator motor to control the gripping and release mechanism of the gripper assembly 804. Gripper assemblies (e.g., those associated with a robotic accessor) configured to retrieve, grip, and/or release a data storage cartridge or other components in a data storage library will not be described in detail since they are known in the art in connection with robotic accessors.

In an embodiment, a holding structure 820 of the package holding and/or securing assembly 804 may be configured to securely hold and/or store data storage cartridges and/or other components during transfer. Examples of holding areas may include, without limitation, storage slots configured to hold one or more data storage cartridges, magazine slots configured to hold one or more data storage cartridge magazines, magnetic or electrical holding structures, or the like. In one example, the holding structure 820 of a drone may include a component retaining mechanism that may be operated to release and/or hold a data storage cartridge in response to commands from a control unit, in response to a docking operation, via a force exerted by a library accessor, or the like. For example, the retaining mechanism may be a clamping force or a friction based mechanism that may be released upon application of a suitable force by a library accessor. In another example, the holding mechanism may be a latch that may be operated in response to a docking action via instructions from a docking controller or an automatic mechanical operation (e.g., engagement or disengagement of landing structures of a drone at a docking station may cause movement of the latch).

In an embodiment, a docking/landing structure 803 may be configured to assist the drone 800 in attaching to, engaging, and/or being associated with a docking structure 601 (e.g., 701 of FIG. 7) of a docking station. Examples of the docking/landing structure 803 may include, without limitation, docking pins, skids, slides, sledges, tethers airframes, wheels, latches, grooves, recesses, channels, pins, tethers, or the like. In an embodiment, the docking/landing structures 803 may also include landing sensors 815 such as, without limitation, optical sensors, radio sensors, camera sensors, proximity sensors, magnetic sensors, acceleration sensors, or other sensors. Alternatively, and/or additionally, the landing sensors may be contact or pressure sensors that may provide a signal that indicates when the drone 800 has made contact with a surface such as a docking station. In some embodiments, the docking/landing structure 803 may also be configured to include a coupling interface (e.g., a coupling interface that electrically couples with the coupling interface 605 described above with respect to FIG. 6) to provide the ability to charge a drone power source (e.g., battery) when the drone 800 is docked on and/or associated with a docking station, such as through charging connectors or power lines. The coupling interface may also provide direct power to the drone (e.g., the gripper assembly 821) when the drone 800 is docked at the docking station. Additionally, the landing structure 803 may provide additional connections with a docking station, such as wired communication or control connections. As shown in FIG. 7, the landing structures (i.e., docking pins 702(*a*) and 702(*b*) in FIG. 7) are configured to allow docking of a drone. Other embodiments for docking/landing structures 702 are contemplated and within the scope of this disclosure.

The drone 800 may further include a control unit 808 that may house various circuits and devices used to power and control the operation of the drone 800. In an embodiment, the control unit as used herein is intended in its broadest sense as a device that includes at least one processor, and optionally further circuitry, memory and/or logic, for controlling the drone 800 and drone subsystems. A typical control unit is described above with respect to FIG. 4. In an embodiment, the control unit of a drone 800 may be configured with processing and communication devices that enable the device to, for example, determine a flight plan, navigate (such as by controlling the flight motors to achieve flight directionality), and receive position information and other information from other system components including an external host system, system controller, and/or the library controller. Position information may include the current drone position and/or positional information obtained regarding source or destination storage slots, data storage drives, I/O stations, charging stations, docking stations, etc.

In an embodiment, a drone may also include various sensors, for example vision systems, proximity sensors, light detection and ranging ("LIDAR") sensors, etc. for detecting obstructions, navigation, communication with other devices, or the like. In an embodiment, when a drone is following a flight plan, it may utilize various sensors to detect local obstacles and avoid collision and then return to the flight plan. For example, the drone may have a vision system to see obstacles, laser and/or sonic range finders to determine a distance to obstacles. For example, a drone may have a laser-based scanning system that detects objects (such as other drones in the data storage library) and their distance and velocity so the drone may determine a path to take to avoid such obstacles.

In an embodiment, a drone may utilize fine-grain communication, for example using multilateration or triangulation of short range wireless transmitters, magnetometers, laser guides or LIDAR technologies, radar guidance, ultrasonic sensors, global positioning systems (GPS), global navigation satellite system (GNSS), or any other devices configured to provide relative or global positioning feedback such that the drone can approach, land on or in, attach, dock, or become associated with a docking station, or other location in the data storage library. Alternatively and/or in addition, the drone may be equipped to navigate by receiving beacon signals, radio frequency identification (RFID) signals, position references, or other signals from radio nodes, such as WiFi access points. Furthermore, the drone may have a sensor to measure altitude (e.g., a pressure sensor). A drone may utilize any now or hereafter known sensors, guidance, and/or positioning systems.

In one embodiment, the system and/or drones may be programmed to navigate the data storage library in a predetermined path, and the pathways may be programmed to avoid collisions. For example, the drones may be configured to navigate in a horizontal path in a first direction along the floor of the data storage library, and navigate in a horizontal path in the opposite direction along the roof of the data storage library.

A drone may also include a communications interface 809 configured to communicate with the external host system, the system controller, docking stations, other drones, and/or the library controller over a network such as via a fine-grain (e.g., wireless) communication or coarse-grain (e.g., cellular) communication. In an embodiment, the communications interface 809 may be part of or associated with the control unit 808. Control unit 808 of drone 800 in an embodiment may receive a request for transferring a data storage cartridge from the external host system, the system controller, and/or the library controller, and may control the transfer of the data storage cartridge by controlling the movement of the drone.

In an embodiment, a drone 800 may also include a scanner module 812 (shown schematically in FIG. 8) configured to receive identification and/or other information (e.g., by scanning identifying labels) from a data storage cartridge, data storage magazine, and/or other components. Examples of a scanner module may include, without limitation, RFID scanner, a smart card reader, quick response codes scanner, bar code scanners, laser scanners, electrical/optical equipment with recognition software, infrared scanners, radar, sonar, chemical sensors, or an audio/visual device with recognition software. Such scanner modules are known in the art to identify, track, and locate stored items by, for example, attaching, spatial and identification information as RFID tags, barcode, etc. on the data storage cartridges and/or other components. In an embodiment, the scanner module 812 may be included in the gripper assembly 821.

Referring back to FIG. 5, external host system 520 may be a computing device, such as a server, mainframe, laptop computer, a tablet computer, a netbook computer, a personal computer (PC), a desktop computer, a personal digital assistant (PDA), a smart phone, a thin client, or any programmable electronic device capable of communicating with the system controller 530 via network 540. In an embodiment, the external host system 540 may also communicate with one or more drones 510a-n of the data storage library 500. In other embodiments, external host system 520 may be a management server, a web server, or any other electronic device or computing system capable of receiving and sending data. External host system 520 may include internal and external hardware components, as depicted and described above in further detail with respect to FIG. 4.

In an embodiment, network 540 can be, for example, a SCSI (Small Computer Systems Interface) bus, a Fiber Channel Arbitrated Loop, a local area network (LAN), a wide area network (WAN) such as the Internet, a virtual private network (VPN), a storage area network (SAN), a direct (point-to-point) connection, or combinations thereof, and can include wired, wireless, or fiber optic connections. In general, network 540 can be any combination of connections and protocols that will support communication between external host 540 and various components of the data storage library.

In an embodiment, a system controller 530 is configured to be in communication with an external host system 520, the drones 510a-n in the data storage library 500, the docking stations, and/or other components of the data storage library and controls the transfer of components and/or data storage cartridges between storage slots, magazines, data storage drives, I/O stations, docking stations, charging stations, and/or other locations within the data storage library. System controller 530 may be a management server, a web server, or any other electronic device or computing system capable of receiving and sending data. In other embodiments, system controller 530 can represent a computing system utilizing clustered computers and components to act as a single pool of seamless resources when accessed through a network. In this exemplary embodiment, system controller 530 is capable of receiving requests for data and/or media, or transfer of a data storage cartridge between data storage slots, data storage magazines, data storage drives, robot accessors, and/or I/O stations from external host system 520, via network 540, determining the required actions, and/or converting the actions to physical movements of the drones in the library. "System controller" in its broadest sense is a device that includes at least one processor, and optionally further circuitry, memory, and/or logic, and may include internal and external hardware components, as depicted and described in further detail with respect to FIG. 4. In an exemplary embodiment, the system controller 530 may be a library controller associated with data storage library 500 discussed above with respect to FIG. 3.

In an embodiment, the system controller 530 may include or may be in communication with a data storage cartridge database. Data storage cartridge database is a central repository of data associated with data storage cartridges stored in various library locations (e.g., library frames, I/O stations, data storage drives, etc.) of the data storage library 500. For example, the data storage cartridge database may include location and access information for each data storage cartridge located in data storage library 500. For example, the database may include frame identification, data storage cartridge identification information (e.g., barcodes), element addresses, library shelf numbers, data storage cartridge positions within each library shelf, and the time of access of each data storage cartridge, among other information. In an exemplary embodiment, the data storage cartridge database is periodically or continuously updated based on information received from library controllers and/or drones. In an embodiment, library controllers and/or the drones may also access information included in the data storage cartridge database.

In an embodiment, the system controller 530 processes requests for data or transfer of data storage cartridges from the external host system 520 by accessing the data storage cartridge database and determining a location of the requested data and/or data storage cartridge. In an exemplary embodiment, the system controller 530 also stores (and/or can access) the position and status of each drone 510a-n, such as battery status, defects, and current usage status, and may identify one or more drones 510a-n to transfer the requested data storage cartridge, or a magazine containing the requested data storage cartridge, between storage slots, data storage drives, I/O stations, and/or other locations within the data storage library. For example, the system controller 530 may receive position and status of each of drone 510a-n from one or more drone docking stations 600. The system controller 530 is capable of communicating with drones 510a-n to send data storage cartridge transfer requests and/or read/write requests.

Referring back to FIG. 5, in an example embodiment, the data storage library 500 may also include a power station 560 configured to recharge, refuel and/or swap the energy storage and/or cell on a drone. The power station 560 may include a cradle, surface charger, or similar device as recognized by those skilled in the relevant art(s) as being capable of re-powering a drone. In another embodiment, the power station 560 may include robotic devices that may function to replace a component on a drone, such as, but not limited to, one or more batteries, super capacitors, fuel cells, etc. on the drone or to make other repairs.

Figure 9:
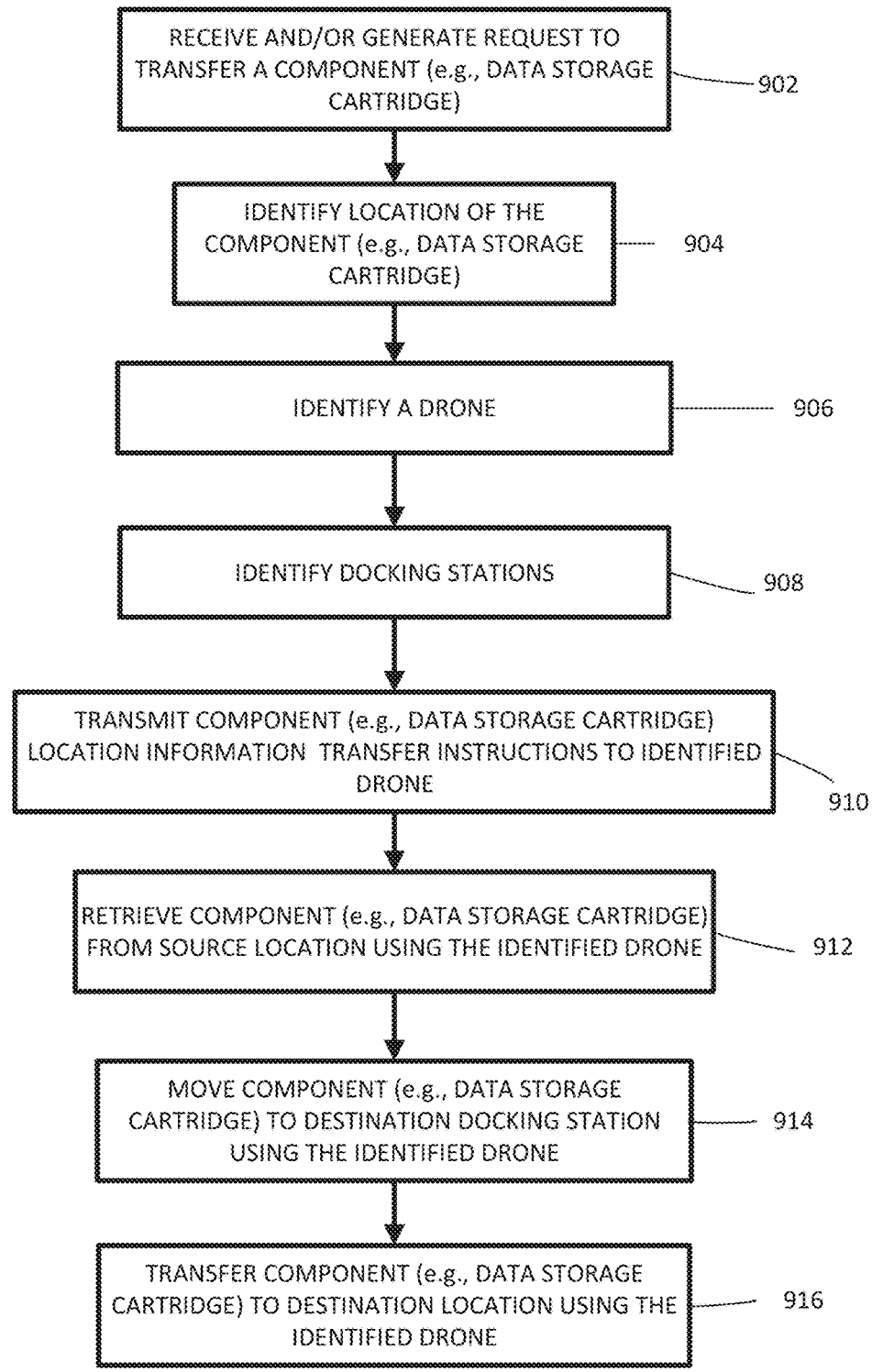
FIG. 9 is a flowchart illustrating an embodiment of a method of transferring data storage cartridges and/or other components in a data storage library.

FIG. 9 is an exemplary flowchart illustrating and describing a method of transferring data storage cartridges and/or other components between data storage slots, data storage magazines, data storage drives, robot accessors, and/or I/O stations in a the data storage library, in accordance with one embodiment of the present disclosure. While the transfer method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, or the steps may be performed in the order disclosed or in an alternate order.

At 902, a request is received and/or generated to transfer a component (e.g., a data storage cartridge, data storage magazine, etc.) within the data storage library. In an embodiment, a system controller associated with the data storage library receives a request to move a component (e.g., a data storage cartridge, data storage magazine, etc.) from, for example, a source location within the data storage library to a destination location (e.g., a storage slot, a magazine slot, a data storage drive, a robot accessor, and/or an I/O station within the data storage library). In an embodiment, the controller may receive the request directly from an external host system.

At 904, the system controller identifies the current location of the requested component (e.g., a data storage cartridge, a data storage magazine, etc.) within the data storage library, for example, at a storage slot, a magazine slot, a data storage drive, a robot accessor and/or an I/O station. In an embodiment, the location information may include an identification of the frame that currently stores the component (e.g., data storage cartridge) and/or an identification of the storage slot, magazine slot, data storage drive, robot accessor, and/or I/O station within the data storage library (the "source location"). In an exemplary embodiment, the system controller may access and search the data storage cartridge database to determine a location of the component (e.g., data storage cartridge, data storage magazine, etc.) within the data storage library. In an alternate embodiment, the controller may send a query to the library controller associated with the data storage library and receive the location from the library controller. Alternatively, and/or additionally, the external host system may provide the component (e.g., data storage cartridge, data storage magazine, etc.) location in the data storage library to the system controller.

At 906, the system controller identifies a drone associated with the data storage library to receive the requested component (e.g., data storage cartridge, data storage magazine, etc.) from the source location and which will transfer the requested component (e.g., data storage cartridge, data storage magazine, etc.) to the destination location. In an exemplary embodiment, the system controller optimizes the movement of drones within the data storage library by choosing a drone which minimizes the time and/or resources required to complete the transfer. For example, the system controller may identify the drone which is closest to the source location and available to perform a transfer. As discussed below, drones not engaged in transferring a component (e.g., data storage cartridge, data storage magazine, etc.) preferably may be configured to be docked at a docking station. In an embodiment, a drone closest to the source location may be a drone attached to the docking station of a storage frame that includes the source location. Alternatively, a drone closest to the source location may be a drone attached to a docking station of a storage frame closest to the source location and/or a drone already in flight. In yet another embodiment, a drone closest to the source location may be a drone attached to a docking station that is located a distance from the source location that is less than or equal to the maximum length of the drone's gripper assembly.

At 908, the system controller identifies at least one docking station corresponding to the source location ("source docking station") and at least one docking station corresponding to the destination location ("destination docking station"). In an embodiment, the system controller identifies the source docking station and destination docking station based on, without limitation, optimization of the movement of the identified drone within the data storage library (e.g., based on the current location of the identified drone, distance between a source docking station and a destination docking station, etc.); accessibility of the source location and the destination location, by the gripper assembly of the identified drone, from the source docking station and the destination docking station, respectively; distance of the source location and the destination location from the source docking station and the destination docking station, respectively; position of other drones within the data storage library; status of other requests to transfer data storage cartridges within the data storage library; vacancy or availability of a docking station; or other criteria. For example, the source docking station may be a docking station that requires the least travel time from a current position of the identified drone and that provides access to the source location to a docked drone. A destination docking station may be a docking station that requires the least travel time from the source docking station after component (e.g., data storage cartridge, data storage magazine, etc.) retrieval and that provides access to the destination location to a docked drone. In an alternate embodiment, control unit of the identified drone may identify the source docking station and/or the destination docking station based on one or more of the above criteria. In an embodiment, the destination docking station may be identified after the identified drone has retrieved the component (e.g., data storage cartridge, data storage magazine, etc.) from the source location to allow for the use of current and updated information relating to the above criteria.

At 910, the system controller transmits the location information for the requested/identified component (e.g., data storage cartridge, data storage magazine, etc.) to the control unit of the identified drone along with instructions to deliver the component (e.g., data storage cartridge, data storage magazine, etc.) from the source location to the destination location. The system controller may also send additional information to the drone such as, without limitation, component (e.g., data storage cartridge, data storage magazine, etc.) identification information (e.g., barcodes, RFID, etc.), identity of the source docking station, identity of the destination docking station, or the like. In an embodiment, the system controller 530 may communicate directly with a drone. Alternatively, and/or additionally, the system controller may communicate with a drone via a library controller of the data storage library and/or a docking controller of a docking station at which the drone is docked at the time of communication. In an alternate embodiment, the system controller may instruct a drone to move to a source location and may provide information relating to the destination location and instructions to deliver the component (e.g., data storage cartridge, data storage magazine, etc.) from the source location to the destination location after it attaches to a docking station close to the source location. The drone may communicate and receive instructions and data wirelessly and/or through a wired connection, for example, while it is docked at a docking station. In an alternate embodiment, a drone may determine the location of a component (e.g., data storage cartridge, data storage magazine, etc.) using identification information corresponding to the component (e.g., data storage cartridge, data storage magazine, etc.) and its scanner module, utilizing methods now or hereafter known to those skilled in the art.

At 912, the identified drone flies to the source docking station, associates with (e.g., attaches to) the source docking station (if not already docked at the source docking station), and retrieves the component (e.g., data storage cartridge, data storage magazine, etc.) from the data storage slot, magazine slot, data storage drive, robot accessor, and/or I/O station, preferably via the gripper assembly.

In an embodiment, before retrieving the component (e.g., data storage cartridge, data storage magazine, etc.), the drone may confirm that the component (e.g., data storage cartridge, data storage magazine, etc.) in the source location is the requested component (e.g., data storage cartridge, data storage magazine, etc.). In an exemplary embodiment, the drone may scan (using the scanner module) an identification tag (such as an RFID tag, barcode, an identifying image, or the like) on the component (e.g., data storage cartridge, data storage magazine, etc.) and determine whether the information in the identification tag matches the identification information previously received by the drone. If the information in the identification tag matches the identification information previously received by the drone, the drone may retrieve the component (e.g., data storage cartridge, data storage magazine, etc.). If the information in the identification tag does not match the identification information previously received by the drone, the drone may transmit an error message to the system controller and/or request an updated source location.

At 914, the identified drone flies to the destination location to deliver the retrieved component (e.g., data storage cartridge, data storage magazine, etc.). In an exemplary embodiment, the drone may proceed along a programmed and/or a predetermined route from the source location to the destination location. Alternatively, and/or additionally, the drone may determine its own route based on various factors, such as altitude, distance to the destination location, obstacles (e.g., other flying drones, libraries, personnel, etc.), battery life of the drone, retrievability considerations, previous routes, or the like.

In 916, the drone associates with (e.g., lands on and attaches to) the destination docking station. The retrieved component (e.g., data storage cartridge, data storage magazine, etc.) is received in the destination location. In an embodiment, if another drone is already attached to the destination docking station, the system controller (directly or via a library or docking controller), instructs that drone to vacate the destination docking station (e.g., fly to the source docking station and/or another vacant docking station) in the data storage library, in order to avoid collision. Alternatively, the system controller or the drone control unit may identify another destination docking station that provides access to the destination location. In an exemplary embodiment, the vacant docking station may be the source docking station once the identified drone has taken flight to deliver the component (e.g., data storage cartridge, data storage magazine, etc.).

It will be appreciated that the system and method may include one or more drones 510*a-n* that are used to transfer one or more data storage cartridges and/or components between one or more data storage library frames 501*a-n* and/or service bays maintained in a data storage library 500. In an exemplary embodiment, drones 510*a-n* of the current data storage library 500 may be configured to be docked at a docking station when not engaged in transferring components (e.g., data storage cartridges, data storage magazines, etc.). For example, a drone may remain docked at the docking station of a destination location (to which the drone delivered a data storage cartridge) until it receives an instruction to transfer a component (e.g., data storage cartridge, data storage magazine, etc.). As such, a drone may receive power and communications via the landing structures and/or connectors when not engaged in transferring data storage cartridges. Docking the drones when not actively transferring data storage cartridges and/or components may also prevent collisions by reducing the air traffic when the drones are not engaged in transferring and/or transporting data storage cartridges. In an alternate embodiment, the drones may be docked at optimal positions which are computed based at least in part on the physical distribution of the components (e.g., data storage cartridges, data storage magazines, etc.) to be transferred in the storage slots, data storage drives, and/or the location of I/O stations and the number of drones in the data storage library (such as by minimizing the overall travel time for a docked drone to any storage slot, data storage drive, and/or I/O station in the data storage library).

In one example, there could be one drone in the data storage library for each data storage drive. As data storage cartridges are mounted to the data storage drives, the drone would be docked at the drive waiting for read/write operations to complete. This may significantly improve the performance and throughput of the data storage library because the drone would not have to move back to the data storage drive to retrieve the data storage cartridge. The drone transfer system can be used in addition to the robotic accessor system, in association with, and in conjunction with the robotic accessor system, or as an alternate to the robotic accessor system. In an embodiment, the drones can operate in the channels and aisles (shown in FIG. 1 and FIG. 2) of the library where the robotic accessors operate. In this manner, the current construction of the data storage libraries and library frames may be used, and/or data storage libraries and frames can be retrofitted with a drone transfer system.

While the embodiments described herein refer to a drone attaching to a docking station before retrieving and/or transferring or placing a data storage cartridge and/or other components to be transferred, it is to be understood that a drone may retrieve a data storage cartridge from a source location and/or transfer a data storage cartridge at a destination location without attaching to a docking station, for example, while hovering close to the source location and/or the destination location. In another example, the drone may land and/or rest on a surface without physically attaching to the docking station.

In an embodiment, the new location of the data storage cartridge and/or other components may be transmitted to the data storage library and/or the data storage cartridge database. In an exemplary embodiment, the drone remains docked at the destination docking station until the receipt of further instructions. In an alternate embodiment, the drone may be instructed to fly to another vacant docking station based at least in part on the physical distribution of the data storage cartridges and/or other components to be transferred in the storage slots, data storage drives, and/or I/O stations, and/or other criteria.

It should be noted that, unlike robotic accessors which are constrained by the use of guiderails, within limits, any number of drones may be used in the data storage library, which allows for a larger number of redundant component movers (drones), access to areas of the library that may otherwise not be suitable for component locations (e.g., storage slots, magazine slots, drives, etc.), expansion of frames in a data storage library, increasing the number of library frames in a data storage library, and/or expansion of the data storage library itself to increase storage capacity. For example, conventional storage frames include storage slots on opposing walls of the storage frame as shown in FIG. 2, but the use of drones for transferring data storage cartridges and/or other components allows for the provision of storage slots on other walls (including the top and bottom) of a storage frame. Similarly, the dimensions of a data storage library itself may be increased to increase the storage capacity. In an exemplary embodiment, since the drones 510a-n are capable of movement in the x-, y-, and z-coordinate directions, and are not constrained by the use of guiderails, a room that a data storage library resides in may become the library enclosure (without the need of a separate dedicated enclosure). For example, a data storage library may be a room with shelves configured to be storage slots on the walls, floor, roof, or any other position within the room.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage system, the system comprising:
    a data storage library for the storage, reading, and writing of data on a plurality of data storage cartridges;
    at least one drone vehicle;
    a docking station configured to associate with the at least one drone vehicle, wherein the docking station is associated with at least one of the group consisting of a data storage slot of the data storage library, a magazine slot of the data storage library, a data storage drive of the data storage library, at least one robot accessor data storage library, and at least one I/O station of the data storage library;
    a processing device; and
    a non-transitory, computer-readable memory containing programming instructions that are configured to cause the processing device to:
        receive a request to transfer a data storage component to a destination location in the data storage library,
        in response to receiving the request, instruct a drone vehicle to perform at least part of the transfer of the data storage component to the destination location, and
        by the drone vehicle, perform at least part of the transfer of the data storage component to the destination location.

2. The data storage system of claim 1, wherein the data storage library further comprises:
    a plurality of data storage drives;
    a plurality of data storage slots; and
    a library controller.

3. The data storage system of claim 1, wherein the docking station is further configured to communicate with the at least one drone vehicle.

4. The data storage system of claim 1, wherein the docking station comprises:
    a docking structure; and
    a power source configured to supply power to the at least one drone vehicle.

5. The data storage system of claim 4, wherein the docking structure comprises one or more docking aids configured to engage one or more landing structures of the at least one drone vehicle and form a stable attachment.

6. The data storage system of claim 5, wherein the one or more docking aids are selected from the group consisting of: slots, brackets, wedges, channels, grooves, recesses, latches, hooks, pins, tethers, magnetic docking aids configured to exert an electromagnetic field, and combinations thereof.

7. The data storage system of claim 4, wherein the docking station further comprises a coupling interface configured to operably couple the docking station to a frame of the data storage library.

8. The data storage system of claim 1, wherein the at least one drone vehicle comprises:
    a flight assembly;
    a frame;
    one or more landing structures;
    a power source;
    a package holding and securing assembly; and
    a control unit comprising a processing device and a memory.

9. The data storage system of claim 8, wherein the package holding and securing assembly further comprises a holding structure for holding the data storage component during transfer.

10. The data storage system of claim 8, wherein the at least one drone vehicle further comprises a scanner module configured to read information from the data storage component.

11. The data storage system of claim 8, wherein the package holding and securing assembly comprises a gripper assembly configured to perform at least one of the group consisting of: retrieving, releasing, and holding the data storage component.

12. A drone vehicle for transferring components within a data storage library, the drone vehicle comprising:
- a flight assembly;
- a frame;
- at least one landing structure;
- a package holding and securing assembly configured to hold and release the component, the package holding and securing assembly further comprising a holding structure configured to hold a component during transfer and that does not retrieve the component from its storage location;
- a power source;
- a processing device; and
- a non-transitory, computer-readable memory containing programming instructions that are configured to cause the processing device to:
  - receive a command for transferring the component to a destination location,
  - by the package securing system, cause the drone vehicle to retrieve the component from the current location, and
  - by the flight assembly, cause the drone vehicle to move to the destination location;
- wherein the drone vehicle is configured to move and transfer components within the data storage library.

13. The drone vehicle of claim 12, wherein the at least one landing structure comprises at least one landing sensor, wherein the at least one landing sensor consists of at least one of the group of the following:
- an optical sensor;
- a radio sensor;
- a contact sensor;
- a pressure sensor; and
- combinations thereof.

14. The drone vehicle of claim 12, wherein the package holding and securing assembly comprises a gripper assembly configured to perform at least one of the group consisting of: retrieving, releasing, and holding the component.

15. The drone vehicle of claim 12, wherein the drone vehicle further comprises a scanner module configured to retrieve information from the component.

16. The drone vehicle of claim 15, further comprising programming instructions that are configured to cause the drone vehicle to, before retrieving the component from the current location, verify that the component stored in the current location is the requested component using the retrieved information.

17. A method for transferring at least one component within a data storage library, the method comprising:
- identifying a drone vehicle for transferring the at least one component from a current location to a destination location within the data storage library by identifying a drone that optimizes time or resources required for transferring the at least one component to the destination location;
- instructing the drone vehicle, by a processing device, to transfer the at least one component to the destination location; and
- by the drone vehicle, transferring the at least one component to the destination location.

18. The method of claim 17, further comprising:
- identifying current location of the at least one component in the data storage library;
- transmitting, to the identified drone vehicle, the current location of the at least one component; and
- transmitting, to the identified drone vehicle, the instruction to transfer the at least one component from the current location to the destination location.

19. The method of claim 18, wherein identifying the current location of the at least one component comprises receiving the current location from a database.

* * * * *